United States Patent
Arning

[11] Patent Number: 5,936,225
[45] Date of Patent: *Aug. 10, 1999

[54] METHOD AND APPARATUS FOR TABULATING DATA FROM A PLURALITY OF RESPONSE FORMS

[75] Inventor: Edward S. Arning, Colleyville, Tex.

[73] Assignee: Strategic Quantitative Solutions, Inc., Irving, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/626,399

[22] Filed: Apr. 2, 1996

[51] Int. Cl.$^6$ .................................................. G06K 7/10
[52] U.S. Cl. ........................................ 235/470; 235/456
[58] Field of Search ................................. 235/456, 470; 382/217, 219, 220, 221

[56] References Cited

U.S. PATENT DOCUMENTS

| | | | |
|---|---|---|---|
| 4,430,563 | 2/1984 | Harrington | 235/456 |
| 4,510,617 | 4/1985 | Mori | 382/33 |
| 4,949,392 | 8/1990 | Barski et al. | 382/417 |
| 5,101,447 | 3/1992 | Sokoloff et al. | 235/456 |
| 5,134,669 | 7/1992 | Keogh et al. | 382/318 |
| 5,140,139 | 8/1992 | Shepard | 325/456 |
| 5,198,642 | 3/1993 | Deniger | 235/456 |
| 5,229,589 | 7/1993 | Schneider | 235/456 |
| 5,428,694 | 6/1995 | Betts et al. | 382/317 |
| 5,521,991 | 5/1996 | Billings | 382/317 |

*Primary Examiner*—Donald Hajec
*Assistant Examiner*—Mark Tremblay
*Attorney, Agent, or Firm*—David H. Judson

[57] ABSTRACT

A system for processing a plurality of response forms containing subsets of questions from an entire set of question is disclosed. This system includes an optical scanner for creating an optical image of the response form. The optical image is stored in an image file within a storage means by a processor. The form contained in the optical image is identified by comparing vertical and horizontal histograms of the image within the image file to vertical and horizontal histograms of prototype form images in a prototype library using the processor and a form recognition engine. Data is extracted from the form based on a comparison of response zones on the image to a library of sets of response prototypes describing completed and uncompleted responses. The closest response zone match using the histogram technique to describe the response zone and the samples becomes the data, yes or no; that is reported.

11 Claims, 2 Drawing Sheets

SUNSET CRUISES

|   | 1 | 2 | 3 | 4 | 5 |
|---|---|---|---|---|---|
| 1. SERVICE | ○ | ○ | ○ | ○ | ○ |
| 2. ROOM | ○ | ○ | ○ | ○ | ⊘ ⟵ 50 |
| 3. STAFF | ○ | ○ | ○ | ○ | ○ |
| 4. FOOD | ○ | ⊘ | ○ | ○ | ○ |
| 5. ENTERTAINMENT | ○ | ○ | ○ | ○ | ○ |

50 ⟵

| 1 | 2 | 3 | 4 | 5 |
|---|---|---|---|---|
| POOR | FAIR | AVERAGE | GOOD | EXCELLENT |

ABC123

SUNSET CRUISES

1. HOW WAS YOUR CRUISE

○    ○    ○    ⊘ 50    ○
1    2    3    4    5
POOR                         EXCELLENT

2. HOW WAS YOUR ROOM

○    ⊘ 50    ○    ○    ○
1    2    3    4    5
POOR                         EXCELLENT

3. HOW WAS THE SERVICE

○    ○    ⊘ 50    ○    ○
1    2    3    4    5
POOR                         EXCELLENT

*FIG. 5*

METHOD AND APPARATUS FOR TABULATING DATA FROM A PLURALITY OF RESPONSE FORMS

TECHNICAL FIELD

This invention relates to data processing systems, and more particularly to a method and system for processing data contained in response forms.

BACKGROUND OF THE INVENTION

A common method of receiving feedback from customers of businesses is through the use of response forms such as comment cards. An owner of a business can use the responses gleaned from his customers to improve services, spot unsatisfactory areas of his products or services or to evaluate marketing techniques and potential. In short, the comments of a customer who has just patronized an establishment are one of the most powerful sources of information to the owner of the business. In the past, the inconvenience to the customer of filling out a response form or using other types of customer surveys have reduced the effectiveness and accuracy of the comments received. For example, if a response form takes more than just a few seconds for a customer to fill out, chances are that the average customer will not bother to fill out the form unless he is especially dissatisfied or satisfied with some area of the business. This inconvenience results in inaccurate data compiled from the system.

Other systems such as those disclosed in U.S. Pat. Nos. 5,023,435 and 5,198,642 use a method wherein the total questions desired be queried to customers of the establishment are broken down into subgroups, and a particular customer is only required to answer a few of these questions. These systems then directly process the forms by identifying each form from a bar or block coding area on the form that describes the format and questions of the form. Once the format is identified, the forms are directly processed to extract data from them, and a tabulation database is created on a form-by-form basis. These systems are useful but require a customer to utilize a standardized form format due to the direct processing requirements of the system. The forms for such systems also must be printed with a special combination of graphite and non-graphite inks to enable direct processing of the forms. Also, printing must be done based on tight positioning alignment and trimming tolerances.

Accordingly, a need has arisen for a system for soliciting responses from customers that will encourage the accurate compilation of data for a customer database while processing response forms of an infinite variety of formats.

SUMMARY OF THE INVENTION

The present invention overcomes the foregoing and other problems with a system for tabulating data from arbitrarily formatted response forms containing selected subsets of a larger set of questions. Each form is comprised of a set of questions and a set of response areas that can be described mathematically by x and y positioning coordinates relative to each other and the form itself. In other words, every form is comprised of questions, logos, and responses that are in set positions on the form. The system includes an optical scanner for receiving response forms which have been filled out by a customer of a client using the system. The scanner generates an image picture which is stored in an image file for each scanned response form. The image file essentially comprises a picture of the form. Each generated image file is stored at a memory location until processed to extract individual responses. A recognition means reviews the stored image files, and the files are processed to determine the format form and/or subset of questions represented within an individual image file by comparing horizontal and vertical histograms of the image in the image file to a library of prototype images. Once the form is identified, the responses to the questions are extracted according to this identification. The responses are identified based on a comparison of zoned possible response locations for completed or noncompleted marks. The process to identify the marks is based on comparing sample pictures of possible completed marks and noncompleted marks to determine whether the zone examined is most representative of one set of samples over the other. The ability to compare images or pictures is based on converting the image or picture to a mathematical representation of a histogram or some other convenient mathematical representation. These responses are processed to tabulate and ultimately generate a report on user responses.

The foregoing has outlined some of the more pertinent aspects of the present invention. These aspects should be construed to be merely illustrative of some of the more prominent features and applications of the invention. Many other beneficial results can be attained by applying the disclosed invention in a different manner or modifying the invention as will be described. Accordingly, other aspects and a fuller understanding of the invention may be had by referring to the following detailed description of the preferred embodiment.

BRIEF DESCRIPTION OF THE DRAWINGS

For a more complete understanding of the present invention and the advantages thereof, reference should be made to the following detailed description taken in conjunction with the accompanying drawings in which:

FIGS. 4 and 5 are examples of response forms that may be used by the system of the present invention.

DETAILED DESCRIPTION

Figure 1:
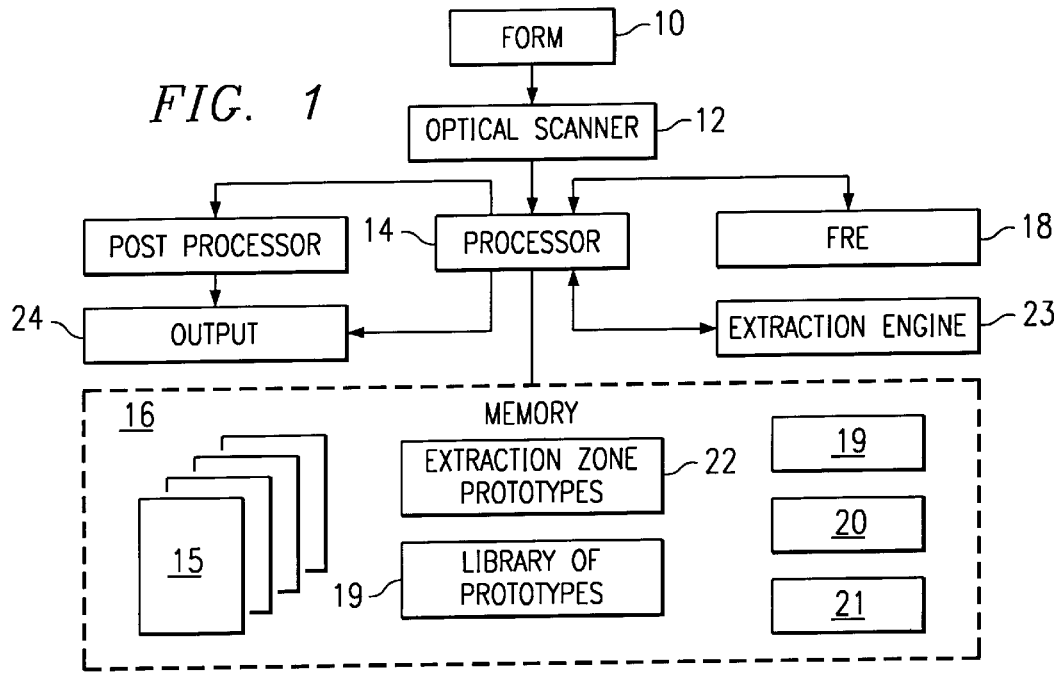
FIG. 1 is a block diagram illustrating the components of the system.

Referring now to the drawings, and more particularly to FIG. 1, there is illustrated a block diagram illustrating the system of the present invention. The system analyzes preprinted response forms 10. The response forms 10 include a subset of questions from a larger group of survey questions that a company or business wishes to ask its customers. By asking only a different few of the questions to each customer, the forms are more likely to be filled out, and a broad customer opinion of the entire question set can be attained by ultimately combining the subsets of responses. The response form 10 is fed to an optical scanner 12 that generates an image from the presented response form. The optical scanner 12 merely creates an image, or takes a picture, of the presented response form 10. No processing of data contained within the response form 10 occurs at this point.

The image created by the optical scanner 12 is downloaded through a processor 14 into a storage memory 16. The data is stored in separate image files 15 for each presented form. Thus, if a hundred response forms 10 are presented to the optical scanner 12 a hundred image files 15 are stored within storage memory 16. Once an image file 15 has been generated and stored, the processor 14 may retrieve an individual image file from storage memory 16 and download the file to a form recognition engine (FRE) 18. The FRE 18 in conjunction with the processor 14 are able to recognize the form and therefor the questions contained within a particular image file 15.

Figure 2A:
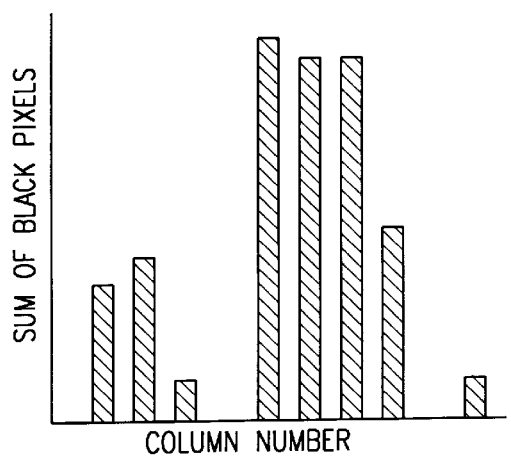
FIGS. 2a and 2b is an illustration of the histograms used for matching a form image or a zone of an image with a particular prototype image or zone of an image.
Figure 2B:
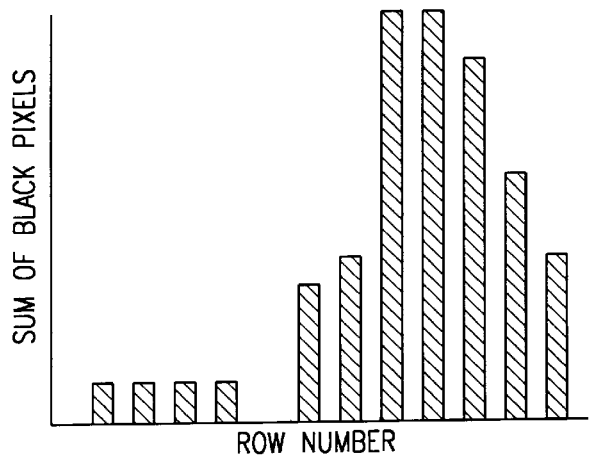

There are a number of ways by which the form may be recognized. In the preferred embodiment, the processor 14 and FRE 18 use a library of prototype forms 19 previously stored in the storage memory 16. This library of prototype forms 19 consists of one image for each of the forms capable of being recognized by the system. Associated with each form image is a vertical and horizontal histogram of the form image. The histograms represent the number of black pixels in the many rows and columns of an image. Thus, as shown in FIGS. 2a and 2b, a vertical histogram includes bars representing the number of black pixels in each row of a form, and a horizontal histogram represents the number of black pixels in each column of a form. For example, if the image is scanned at 200 dpi or 200 dots per inch and the form is an 8.5"×11" piece of paper, there would be 1,700 (8.5×200) pixel columns and 2,200 (11×200) pixel rows represented by the histogram. These histograms provide a digital representation of the forms in the horizontal and vertical directions that forms a finger print for a form and allows forms to be compared, identified and associated with other forms. Alternatively, the number of white pixels could be counted instead of the number of black pixels. If a color picture were utilized, the number of a particular color, or group of colors could be counted, or any other well-known method could be utilized.

Processor 14 loads the image and performs any necessary alternations to the image prior to sending the image to the FRE 18. Possible adjustments include deskewing the image (making the picture upright rather than slanted) or cropping the image to remove unwanted borders. The FRE 18 and processor 14 identify a retrieved form image by generating vertical and horizontal histograms for the image and comparing these histograms to those in the library of prototype forms 19 to determine a closest match within a particular tolerance range. If a first comparison to the library of prototype forms 19 does not provide a match candidate within the desired tolerance range, a secondary recognition phase begins where the histogram comparisons are refocussed on specific areas of the form. For example, a form image could have a distinctive logo, word or group of words in a particular region on the form. The vertical and horizontal histograms for this particular region of the form are generated and compared to the histograms for the corresponding regions of the images contained within the prototype library 19. These distinctive feature regions on forms within the prototype library 19 are predetermined and prestored in the library such that the search may be easily performed. Any unique word, logo or group of words of a series of forms can be used in the secondary recognition phase.

Utilizing this more narrowly focused search, the form is identified. In one method, the questions within the image file may be word searched to determine the matching form. For example, the first word of the first question and the last word of the last question on a response form may be used as word search parameters to identify each response form 10. It should be noted that a variety of recognition techniques are possible using a combination of form recognition techniques with the processing capabilities of the processor 14. Thus, the present invention should not be limited to those methods discussed above.

Once the FRE 18 has identified the form processor 14 extracts the responses to the questions, and this information is downloaded into a an extraction file 20 within storage memory 16. Processor 14 extracts the response data within a form image using image comparison techniques. Extraction zones within each image are saved with each image prototype 19. These extraction zones are defined relative to other portions of the prototype image and may comprise bubbles, squares or any other area for recording response data. For example, it would be typical to have several response zones below or next to a question. The location of extraction zones containing possible response alternatives are defined in a prototype of the prototype library 19 by the x and y coordinates of two corners of the extraction zone. The x and y coordinates represent the column and row of pixels in the histogram representation of the image where the extraction zone or zones are defined.

The extraction zone is then treated as a small image. This small image is compared to two sets of prototype extraction zone prototype images 22. One set of images represents one or more examples of marked response fields and the other set of sample images represents one or more examples of unmarked response fields. All sample images are represented by histograms and/or other mathematical representations. The extraction engine 23 selects the histogram that most closely matches the image from the extraction zone. This closest match allows the extraction engine to describe the response zone as a Y representing a completed response or an N representing a blank response. This information is stored in the extraction file 20.

The extraction file 20 contains responsive answers and an identification for the form from which the responses were extracted. The processor 14 integrates the responses from each form to create a compilation file 21 within memory 16. The responses from each of a plurality of image files 15 are tabulated to provide an indication of customer satisfaction over a wide variety of topics covered by the question set. A final report generated from the compilation file 21 may be downloaded to an output module 24 consisting of a computer workstation, printer, display screen, etc., for review.

Figure 3:
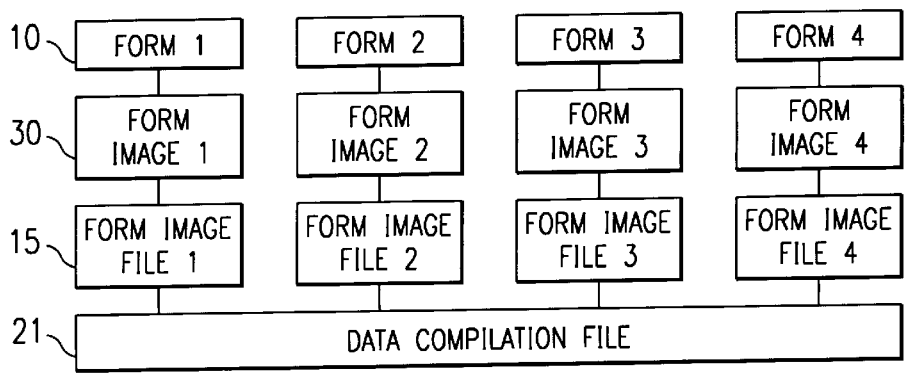
FIG. 3 is a diagram illustrating the method by which a plurality of forms are combined into a data compilation suitable for generating reports.

Referring now to FIG. 3, there is more fully illustrated the method by which a plurality of response forms 10 are combined into a single compilation file 21. The procedure encompasses a two-pass process wherein during a first pass response forms 1 through 4 are sequentially scanned into the optical scanner 12. Each of these forms 10 creates a separate form image 30 that comprises a pictorial representation of a response form 10. This form image 30 is retained in an image file 15 which may be immediately processed or stored for future processing in storage memory 16. The second pass of the system performs an analysis of the form image within the image files using the FRE 18 and processor 14. In this pass, or series of passes, the image file 15 is processed to recognize the form. The responses contained within the image files 15 are extracted based on locations identified in a prototype so that the responses may be tabulated and stored along with the prototype identifier in the extraction file 20. Since the system is processing image data rather than the response forms themselves to extract responses, the system can analyze response forms having an infinite number of formats. Due to the fact that image data is being analyzed, no particular response form format is required, no special considerations of alignment tolerances or trimming tolerances are needed and special inks are not required. Thus, the system may be easily modified to review and recognize any form. The amount of tolerance can be set for any of the recognition phases; form or data extraction in the FRE 18. This ability to describe tolerance thresholds assists in the capability of making recognition decisions.

Referring now to FIGS. 4 and 5 there are illustrated two examples of forms which may be analyzed using the present invention. In the form illustrated in FIG. 4, the image file is analyzed with the FRE 18 and processor 14 to search for the alphanumeric code subset for ABC123. This designation may be located any place on the form, and the position may change from form to form. This designator, when compared to the library of available prototypes, indicates to the processor 14 a specific format and question subset for this response form. The form in FIG. 5 is processed by the FRE 18 and processor 14 using a word search or word location identification coding to designate the format and question subset involved. In this case, for example, the first word of the first question "How" combined with the last word of the third question "service" would indicate the particular questions and format involved for the response form. Other response forms would obviously have different combinations of words in these positions. The information contained in the forms is extracted from extraction zone 50. It should be appreciated that due to the flexibility provided by the analysis of images rather than data by the processing system, forms for the same overall question database may have varying formats as illustrated in FIGS. 4 and 5.

It should be appreciated by those skilled in the art that the specific embodiments disclosed above may be readily utilized as a basis for modifying or designing other structures for carrying out the purpose of the present invention. It should also be realized by those skilled in the art that such equivalent constructions do not depart from the spirit and scope of the invention as set forth in the appended claims.

I claim:

1. A system for tabulating data from arbitrarily formatted response forms, comprising:

an optical scanner for scanning a response form and generating an image of the scanned response form consisting of a plurality of pixels and their position on the scanned response form;

a prototype library containing images for a plurality of different response forms and of a plurality of different responses, each image having a first mathematical representation of the pixels on the different response form extending in a first dimension and a second mathematical representation of the pixels on the different response form extending in a second dimension; and a processor for generating a first mathematical representation of the pixels on the scanned response form extending in the first dimension and a second mathematical representation of the pixels on the scanned response form extending in the second dimension and comparing the generated first and second mathematical representation to the first and second mathematical representations of the prototype library to identify the scanned response form and the responses contained by the scanned response form.

2. The system of claim 1 further including a storage means for storing image files containing a plurality of images generated by the optical scanner.

3. The system of claim 1 wherein the processor further includes a form recognition engine for performing a first comparison between the first and second mathematical representations of the entire scanned response form and the first and second mathematical representations of the prototype library to determine a matching form, and if no matching form is found, for performing a second comparison between the first and second mathematical representations of preselected portions of the scanned form and the first and second mathematical representations of corresponding preselected portions of the prototype library forms to determine a matching form.

4. The system of claim 1 wherein the processor further extracts and tabulates the responses from the scanned image.

5. The system of claim 1 wherein the processor further generates first and second mathematical representations of any extraction zone in the scanned image and compares the generated first and second mathematical representations of the extraction zone to the first and second mathematical representations of responses in the prototype library.

6. The system of claim 1 wherein the first and second mathematical representations comprise horizontal and vertical histograms.

7. A method for tabulating data from a plurality of arbitrarily formatted response forms, comprising the steps of:

generating an image for each of the plurality of arbitrarily formatted response forms consisting of a plurality of pixels and their positions on the response form;

generating a first mathematical representation of the pixels on the response form extending in a first dimension and a second mathematical representation of the pixels on the response form extending in a second dimension for each of the generated images;

comparing each of the generated first and second mathematical representations to first and second mathematical representations in a prototype library, each of the first and second mathematical representations of the prototype library being associated with an image of a prototype form having known responses entered thereon, to determine a matching image; and tabulating the known responses of the matching images.

8. The method of claim 7 further including the step of scanning the plurality of forms with an optical scanner.

9. The method of claim 7 further including the step of storing the generated images in separate image files for each image.

10. The method of claim 7 wherein the step of comparing further includes the steps of:

comparing the first and second mathematical representations for an entire image to the first and second mathematical representations of entire prototype form in the prototype library to locate a matching image; and if no matching image is located, comparing first and second mathematical representations of a selected portion of the image to first and second mathematical representations of a corresponding selected portion of prototype form in the prototype library to locate a matching image.

11. The method of claim 7 wherein the first and second mathematical representations comprise horizontal and vertical histograms.

* * * * *